Patented Apr. 20, 1937

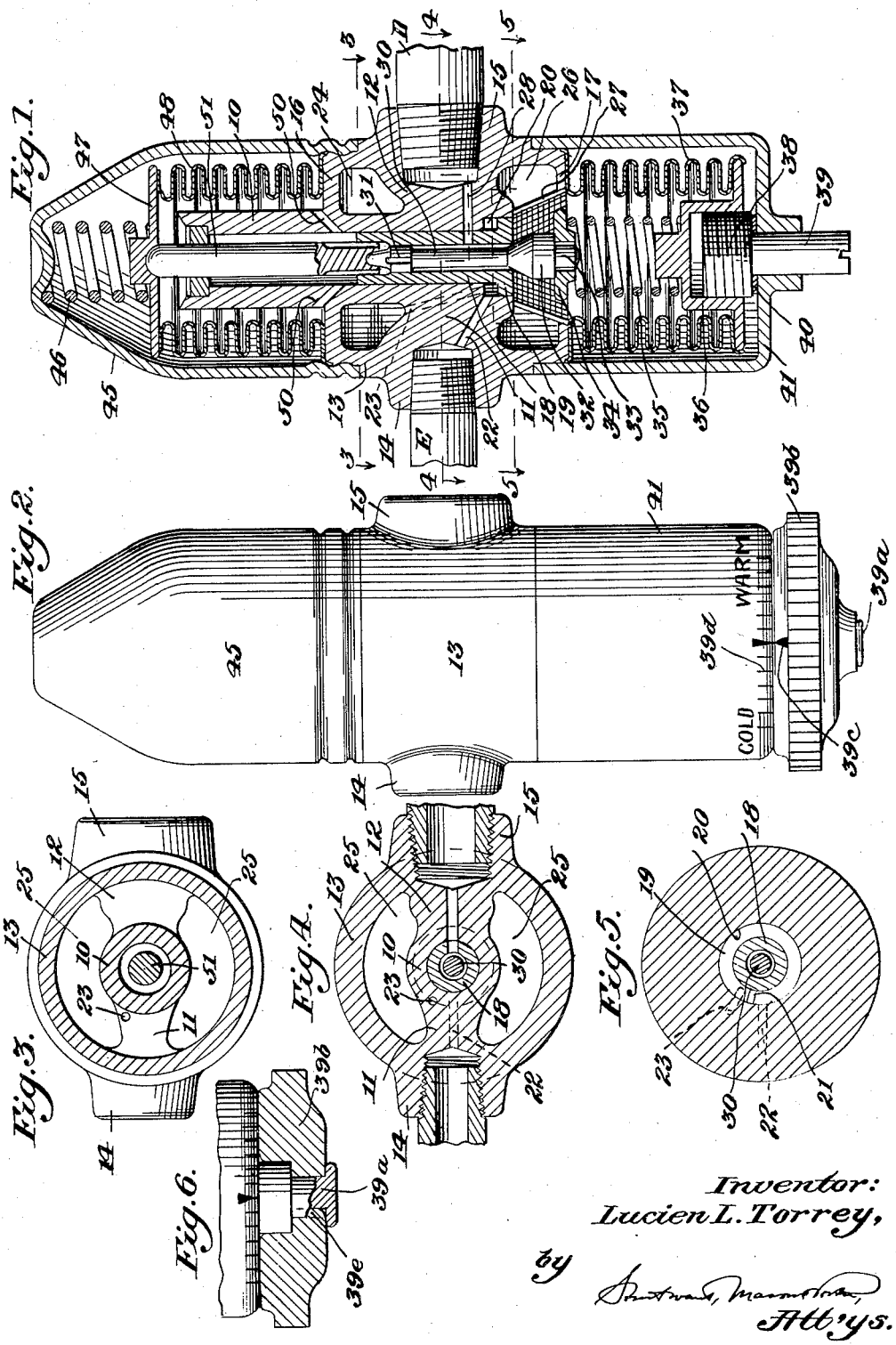

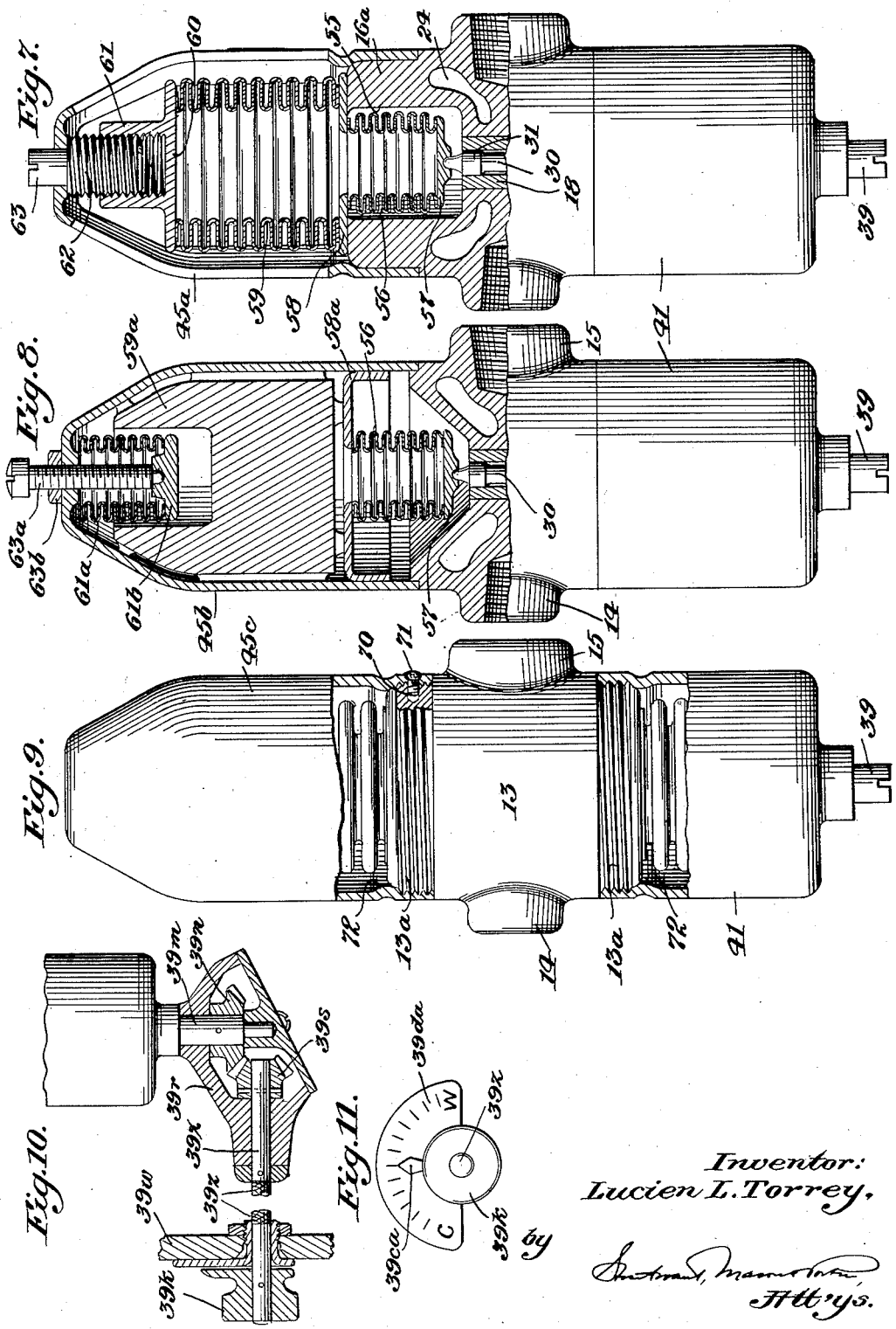

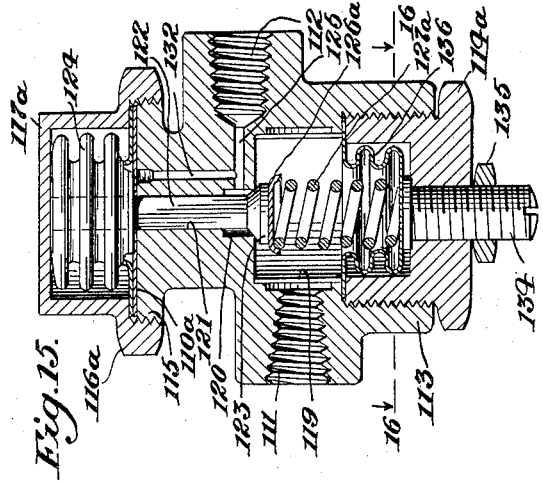

2,078,108

UNITED STATES PATENT OFFICE 2,078,108

AUTOMATIC CONTROL VALVE

Lucien L. Torrey, Los Angeles, Calif.

Application December 16, 1933, Serial No. 702,820

18 Claims. (Cl. 236—92)

This invention relates to improvements in automatic control valves, and is particularly adapted for employment in valves which are utilized in refrigerating plants as expansion valves for controlling the delivery of warm refrigerant liquid, with a release of pressure, to an evaporator system.

One of the features of the present invention is the provision of an automatic control valve operating by a straight-line movement, and comprising a small number of parts which are all contained within and protected by a rigid housing.

Another feature of the present invention is the provision of an automatic control valve having externally operable means for adjustment, with the incorporation of sealing devices for preventing leakage from the valve passages.

A further feature of the present invention is the provision of an automatic control valve for easily volatile liquids, in which the entering liquid is employed to maintain the valve seat and associated parts sufficiently warm to prevent frost condensation thereon, as a result of the usual evaporator occurring upon a reduction of the pressure of such a liquid.

Still another feature of the present invention is the provision of an automatic control valve having a straight-line motion, and incorporating balancing means for rendering the valve sensitive and readily responsive to control conditions.

A still further feature of the present invention is the provision of a valve having its operating parts sealed against the entrance of water vapor, and including adjustment means for determining the sensitivity and the condition of response of the valve, said adjustment means likewise operating through the sealed system to prevent the penetration of water vapor to parts which must move during the control actuation of the valve.

Other features of the invention reside in particular details of construction and assembly of the parts, as will be apparent in the course of the following specification and claims.

Illustrative ways of constructing and arranging valves according to the present invention are shown on the accompanying drawings, in which:

Figure 1 is an axial sectional view through one form of the valve.

Figure 2 is a side elevation of the same.

Figures 3, 4, and 5 are successive transverse sections substantially on lines 3—3, 4—4, and 5—5 of Figure 1, respectively.

Figure 6 is a detail sectional view of an adjusting member.

Figure 7 is a view partly in diametrical section and partly in elevation of a modified form of the valve.

Figure 8 is a similar view of a further modification.

Figure 9 is a similar view showing modifications in the manner of attaching the closure caps.

Figure 10 is a detail view, partly in section, showing a further form of control device.

Figure 11 is a face elevation of the control knob and dial of Figure 10.

Figure 12 is a side elevation of a further form of the valve.

Figure 13 is a diametrical section of the construction shown in Figure 12.

Figure 14 is a fragmentary sectional view of the cap thereof, substantially on line 14—14 of Figure 12.

Figure 15 is a diametrical sectional view of a still further form of the valve.

Figure 16 is a transverse section substantially on line 16—16 of Figure 15.

The present invention relates to the construction of an automatic control valve, by which the closure element is given a rectilinear movement, and all parts are contained within a small volume and are sealed against the escape of the fluid being controlled by the valve.

The device is particularly adapted for employment in a refrigerating plant which has an expansion valve between the receiver for hot condensed refrigerant and the evaporator in which the liquid refrigerant is employed for producing the cold. In such a refrigerating plant, the passage of the liquid refrigerant from the high pressure to the low pressure side of the system, in passing the expansion valve, gives rise to the formation of a quantity of gas, commonly known as "flash" gas, and simultaneously therewith the temperature of the liquid drops. This flash gas is formed by the abstraction of heat from the enclosing walls, and in many valves these walls are brought to such a low temperature that frost forms thereon. Where the valve includes an external operating element of some kind, or it is necessary for the surrounding atmosphere to have access to the valve in order to produce the automatic functioning thereof, such a layer of frost operates either mechanically to block the necessary movement, or as a thermal insulating jacket which prevents the proper response of the valve to varying temperature conditions. It will, however, be understood that the present invention is not limited solely to employment in such a system.

In Figure 1, a valve body is provided comprising a hollow axial sleeve 10 having integral bridge members 11, 12 extending therefrom and joining the outer annular closure wall 13 which is provided with an inlet connection 14 and an outlet connection 15 to the inlet and outlet pipes E and D, through which the refrigerant enters and leaves the valve. The end closure wall 16 joins the walls 10 and 13, and an inwardly extending ledge at one end of the jacket wall 13 and an inwardly extending flange 17 is provided at the other end. The axial sleeve 10 provides a passage in which is received a tube 18 having an annular flange 19 at one end and constituting the valve seat. The flange 19 closes an annular passage 20 formed between it and the body of the valve, being interrupted by a plug 21 (Figure 5) and communicating by passage 22 with the inlet pipe E at one end of the passage 20, and by a conduit 23 adjacent the other end of the passage 20 with an annular space or chamber 24 formed between the axial sleeve 10, the jacket wall 13, and the closing wall 16 and in communication by lateral passages 25 (Figures 3 and 4) with a similar lower annular passage 26. A screen 27 in the form of a truncated cone is joined at its minor base to the sleeve 10, and at its major base to the flange 17. A passage 28 leads from the internal passage of the valve seat tube 18 to the discharge or outlet pipe D through the body of the valve.

A valve stem 30, having an enlarged end 31 which fits and is guided by the inner wall of the tube 18, is provided with a closure member 32 and a pin end 33 which is received within a spring pressure plate 34, so that the closure member 32 is being constantly urged upwardly in Figure 1 by the closing spring 35 which bears against a sealing plate 36 which is sealed to the valve body by an expansible and contractable bellows 37. The end sealing plate 36 is preferably formed with a central upwardly extending cup provided internally with screw threads for engaging the threaded end 38 of a rotatable spindle 39. The shoulder provided by the lower surface of the threaded end 38 preferably rests upon a packing ring 40 which in turn is supported by the end wall of a closure cap 41 which is illustrated as tightly joined, as by soldering, to the valve body, this solder union also preferably extending to form a seal of the bellows with respect to the valve body and closure cap 41. The end of spindle 39 projects externally of the closure cap so that it may be rotated to move the threaded end 38 and thus adjust the stress in spring 35 tending to seat the valve closure member 32.

At the opposite end of the valve body is provided a second closure member 45 against the inner end wall of which rests a balancing spring 46 acting upon an end closure plate 47 which likewise is sealed to an expansion bellows 48, which in turn is joined to the valve body. This upper bellows 48 and the upper closure cap 45 are likewise sealed to the valve body in the illustrative case by rolling the wall of the closure cap so that it is distorted into a peripheral groove in the valve body, and also to provide a secondary inwardly extending bead for gripping and sealing the flange of the bellows; this joint may be made more secure, if desired, by a solder seal.

In Figure 1, it is possible to adjust the stress in spring 35 by employing a screw driver in the kerf at the end of the spindle 39.

In the form shown in Figures 2 and 6, the spindle 39a is upset at its end to engage over the manually rotatable knob 39b which preferably has a milled edge for easy engagement, and is provided with a pointer 39c operating over a scale 39d so that the person adjusting the device can determine whether the adjustment will produce a colder or warmer condition in the associated refrigerator plant, for example, and have a general knowledge of the greater or lesser degree of cooling which will result from the adjustment. As shown in Figure 6, the knob 39b has a key-like portion 39e engaged in a keyway of the spindle 39a.

The operation of this structure is as follows:

The refrigerator plant in the usual way produces hot refrigerant liquid, condensed under high pressure, and delivers it through the inlet pipe E and thence by passage 22 into the annular chamber 20, by passage 23 to the annular chambers 24 and 26, through the screen 27, and thus to the valve closure member 32 and its seat. In the steady operation of the plant, these spaces and also the internal space of the bellows 37 becomes filled with refrigerant liquid. It will be noted that these annular chambers provide a store of relatively warm refrigerant liquid, under the high pressure, adjacent the valve seat and adjacent the passages through which the fluid must move after passing the valve seat.

When the back pressure in the evaporator (connected to discharge pipe D) drops, as by the operation of the compressor, the pressure decreases in the passage 28 and also in the internal space of the seat tube 18, and is communicated to the upper space in the axial sleeve 10 and thence by lateral conduits 50 to the internal space of the bellows 48, causing this bellows to collapse, and its end closure plate 47 to move downward under the balancing action of spring 46 as opposed to spring 35, the movement being transmitted by the pusher 51 to the valve stem 30, and thus opening the valve closure member 32. The reservoir of refrigerant liquid existing just inside the screen 27 is thus tapped, and the refrigerant liquid flows through the valve seat, through passage 28, and the discharge pipe D to the evaporator. Whenever the back pressure increases again, the expansion of bellows 48 causes plate 49 to move upwardly against the action of spring 46, now balanced in the reverse manner by spring 35, and thus closing the valve. This automatic action of opening and closing continues, and it will be noted that the opening of the valve is determined with accuracy by the pressure existing in the discharge pipe D. By moving the end closure plate 36, the pressures of the springs 35 and 46 are increased together, and therewith the valve closure member 32 is brought nearer its seat if open, and is held against its seat with a greater pressure if closed, and thus the response of bellows 48 to the pressure in pipe D is modified.

As the refrigerant liquid passes the valve seat, its pressure is reduced and therewith it tends to cool by reason of evaporation of a part. Heat is thus abstracted from the surrounding walls, but these walls are maintained at a relatively high temperature by the presence of the hot refrigerant liquid on the opposite side. As a result, the jacket of hot liquid prevents the transmission of "cold" to the external walls of the valve body and closure caps, and the valve remains free of frost. Furthermore, the hottest refrigerant liquid must pass through the annular passage 20 in close approximation to the valve seat itself, so that this valve seat is maintained warm at all times, and sticking or gumming by reason of the jellying of lubricating oil thereon is avoided. In operation, it has been found that the device will work for a long period of time without deposit of frost on any portion thereof. It should be noted that the heat for maintaining the valve body and valve seat against frosting and against the gumming of lubricant oil is abstracted from the hot refrigerant liquid entering the valve. Therefore, this "cold" is recovered by the lower temperature of the refrigerant liquid as it passes the valve.

In the form of construction shown in Figure 7, the lower portion of the device (not shown in section) is assumed to be identical with that of Figure 1. The upper portion of the figure illustrates a control system operated thermostatically. The closing wall 16a of the valve body is thickened while the annular chamber 24 is restricted, to permit the use of a cavity 55 for receiving a small bellows 56 having a pressure plate 57 operating upon the upper end of the valve stem 30. The bellows 56 is sealed to a ring 58 to which is also sealed a larger bellows 59 having an end closure plate 60 provided with a cup 61 having internal screw threads receiving the threaded end 62 of a spindle 63. The closure cap 45a is slotted in this arrangement for ready access of the atmosphere to the wall of bellows 59. The bellows 59 and 56 contain a supply of material which evaporates readily, for example, at the maximum temperature to be controlled by the valve, and condenses again readily at the minimum temperature.

In operation, when the temperature of the surrounding atmosphere rises, the heat absorbed by the walls 59 causes a greater evaporation and an increase of the pressure within these bellows. The bellows 59, however, is held against movement by its closure plate 60, so that the entire movement is made by the smaller bellows 56, resulting in a greater movement of the valve stem 30 to open the valve closure member 32 and permit more refrigerant to pass. The internal volume of the bellows 56 and 59 may be varied by turning the spindle 63.

In the form of construction shown in Figure 8, the parts are similar to those in Figure 7, but the closure cap 45b is closed and sealed to the valve body as in Figure 1. The plate 58a is sealed to the cap 45b and to the small bellows 56 and the latter operates through its pressure plate 57 upon the valve stem 30 as in Figure 7. The space between plate 58a and the internal surface of the closure cap 45b is filled with the evaporable liquid. Preferably, the quantity of this liquid is restricted by placing a plug 59a of suitable shape within the closure cap, leaving but a small space for a thin sheet of the evaporable liquid immediately at the inner surface of the closure cap 45b. By having the closure plug 59a of low heat conductivity and low heat capacity, in comparison to the operating liquid, the rate of response is increased. As the operation of the bellows 56 depends upon the prevailing pressure of liquid and gas, the variation of the volume afforded within the closure cap 45b for liquid and gas will accomplish a control of the movement of valve stem 30. For this purpose, the upper sealing bellows 61a is provided, sealed to the closure cap 45b. The end closure plate 61b of bellows 61a may be forced further into the closure cap 45b and thus reduce the effective volume therein by the action of the screw 63a which is threaded in the end of the closure cap 45b and may be secured by a lock nut 63b.

Figure 9 illustrates other manners of establishing a tight seal between the closure cap and the valve body. In the upper part of this figure, the lower skirt of the closure cap 45c is threaded to engage on a threaded portion 13a of the valve body, forming a tight seal, the parts then being secured by a screw 70 which preferably is then rendered inaccessible by a lead sealing plug 71.

In the lower portion of this figure, a similar threaded skirt is provided on the closure cap 41 and engaged with the threads 13a on the valve body, these parts then being joined by soldering to establish a tight joint.

In both forms shown in Figure 9, an internally extending bead 72 is provided for clamping the flange of the bellows down upon the valve body in sealed relationship thereto.

A modified manner of moving the adjusting spindle which regulates the stress in the springs of Figure 1, for example, or the corresponding parts in the other figures, is shown in Figures 10 and 11. The spindle 39m has a large bevel gear 39n fixed thereto. A general housing 39r fits around this gear and also the smaller bevel gear 39s in mesh therewith. The gear 39s is on a shaft 39x, which may include a flexible portion 39z and extends through the outer wall 39w of a domestic refrigerator, for example, and carrying a manually adjustable knob 39k thereon. By turning the knob 39k, the spindle 39m is turned in one or the other direction. By employing the gear reduction between shaft 39x and spindle 39m, a close adjustment is attainable, this adjustment being externally indicated by the movement of the pointer 39ca over a scale 39da.

Another form of temperature-control expansion valve is shown in Figures 12, 13, and 14. The valve body 110 has a connection 111 for the delivery of liquid refrigerant thereto and a connection 112 through which the refrigerant may pass to the corresponding cooling coil. A skirt 113 is provided with a plug 114. A flange 115 is threaded to receive the clamping nut 116 which holds the thermostatic dome 117 in sealed relationship to a gasket 110a on the body 110 by the peripheral flange 118 of the dome 117. A cavity 119 communicating with the inlet connection 111 is extended by a space 120 and a passage 121 for the reception of the stem 122 of a valve head 123 which cooperates with a seat at the upper wall of the chamber 119. The stem 122 is operated in a downward direction in Figure 13 upon the collapsing of a sylphon 124 which is exposed externally to the pressure prevailing within the thermostatic dome 117, so that thermal expansion of a suitable material located within the dome and externally of the sylphon 124 will cause a collapsing of the sylphon and a downward movement of its head, and therewith an opening of the valve 123 so that liquid refrigerant passes from connection 111 past the valve 123 into the space 120 and by the passage 125 to the coil connection 112, so that more liquid refrigerant passes to the coil and the latter is thus cooled by the evaporation and the temperature of the surrounding space is again reduced. The valve 123 is closed by the action of a plate 126 which is forced upwardly by a closing spring 127 bearing against the closing plug 114. The temperature at which the sylphon will be subject to a sufficient pressure for collapsing it to open the valve 123 may be regulated by the variation of the volume of the dome 117, which is accomplished by screwing the threaded member 128 in or out (Figure 14), this member 128 being threadedly engaged in a boss 129 of the dome 117, and being normally locked in position by a lock nut 130.

Although the valve bodies 110 may be constructed differently for the thermally controlled and the vacuum controlled expansion valves, it is also possible, as illustrated, to manufacture these valve bodies in quantity for employment in either type of valve. For this purpose each body is provided with a passage 132 leading from the space within the sylphon 124 to the passage 125, with threads adjacent the upper end of this passage for the reception of the closing plug 133 when the device is to be thermostatically operated (Figure 12).

The vacuum-operated expansion valve (Figures 15 and 16) may then be assembled upon the same valve body by omitting the closing plug 133. This vacuum valve is provided with a cap 116a, which engages the flange 115 to enclose and protect the sylphon 124. The closing plate 126a is forced upwardly by a closing spring 127a whereby to shut the valve 123. This spring 127a may be adjusted by a screw 134 which projects to the exterior of the valve structure and is threadedly mounted in the threaded closing plug 114a thereof, being provided with a lock nut 135 to secure it in adjusted position. In order to prevent any leakage around the threads of the screw 134 or at other points, a sealing bellows 136 is clamped within the skirt 113 by the closing plug 114a, and operates as an intermediate element between the screw 134 and the spring 127a.

The forms of the invention shown in Figures 12 to 16 have been described and shown in my copending application Serial No. 645,602, filed December 3, 1932, of which the present application is a continuation in part, describing and claiming the same.

As pointed out above, the various seals of bodies having no relative movement is accomplished by tight joints, which may be secured by soldering or brazing if desired; while the seals between relatively moving parts are accomplished by bellows devices.

It is obvious that the invention is not limited to the particular illustrative forms, but that it may be employed in many ways within the scope of the appended claims.

Having thus described the invention, what I claim as new and desire to secure by Letters Patent, is:

1. An expansion valve for controlling the flow of refrigerant liquid in a refrigerating apparatus, including a body having a passage with an enlargement at one end, liquid inlet and outlet connections communicating with said passage at axially spaced points thereof, a valve stem movable in said passage and having a valve head for closing the passage between the inlet and outlet connections and projecting beyond the body at its free end, a bellows located externally of the body around the projecting end of said stem, the interior of the bellows being in communication with the passage between the valve head and the outlet connection, means for securing and sealing the bellows to the body, a spring for moving said valve head toward closed position, said bellows operating to move the valve head toward open position, a second bellows sealed to the body for closing the enlarged end of the passage and surrounding said spring, and positive adjusting means for moving said second bellows to regulate said spring.

2. An expansion valve for controlling the flow of refrigerant liquid in a refrigerating apparatus, including a body having a passage with an enlargement at one end, liquid inlet and outlet connections communicating with said passage at axially spaced points thereof, a valve stem movable in said passage and having a valve head for closing the passage between the inlet and outlet connections and projecting beyond the body at its free end, a bellows located externally of the body around the projecting end of said stem, the interior of the bellows being in communication with the passage between the valve head and the outlet connection, means for securing and sealing the bellows to the body, a spring for moving said valve head toward closed position, said bellows operating to move the valve head toward open position, a second bellows sealed to the body for closing the enlarged end of the passage and surrounding said spring, a closure member fixed to the body and including said second bellows, and a screw engaged with said closure member and with said second bellows for moving said second bellows to regulate said screw.

3. An expansion valve for controlling the flow of refrigerant liquid in a refrigerating apparatus including a body having a straight vertical passage, inlet and outlet connections to said passage, said inlet connection communicating therewith at the lower end thereof, said outlet connection communicating therewith at an intermediate point thereof, said body providing a cavity below the lower end of the passage, a valve movable in said cavity for closing said passage at its lower end and having a stem axially movable in said passage, a first bellows extending over and sealing the upper end of the passage and engaged with the upper end of said stem, sealing means connected to the body and surrounding said first bellows, means for collapsing said first bellows, a second bellows sealed to the body for closing said cavity, a spring between the second bellows and the valve for closing the latter upon extension of the first bellows, and means for adjusting said second bellows to regulate said spring.

4. An expansion valve as in claim 3, including a second spring engaged with said sealing means and the first bellows and therethrough engaged with the valve stem for assisting the first bellows in opening the valve.

5. In a valve, a body having a straight passage therethrough, said passage having a smaller portion and having an enlargement at one end, a bushing in said passage having a flange cooperating with the body to provide a chamber at said enlargement, an inlet connection communicating with said chamber, conduit means in said body from said chamber to the end of the bushing for permitting the flow of fluid through the bushing toward an outlet connection, an outlet connection communicating with the interior of the bushing, a valve having a closure means engageable with the bushing adjacent said flange for closing said passage between said connections and also having a stem extending through said small portion, a first bellows sealed to the body around the end of said smaller portion and operatively engaged with said stem for moving the valve closer to open position, a spring for pressing the valve closer into closed position, a second bellows sealed to the body for closing the passage at the enlargement end thereof and surrounding and bearing against said spring, closure means attached to the body and enclosing said second bellows, and adjusting means carried by said closure means for moving said second bellows to regulate said spring.

6. A valve as in claim 5, including a second closure means attached to said body and enclosing the first bellows, and a second spring bearing against said second closure means and against said first bellows for balancing the first said spring.

7. In a valve, a body structure having a straight passage therethrough, said passage having a smaller portion and having an enlargement at one end, means on the body structure providing a valve seat at the junction of the smaller portion and enlargement, an inlet connection communicating with said enlargement, an outlet connection communicating with the smaller portion, a valve having a head engageable with the valve seat for closing said passage between said connections, said body also having an annular passage spaced from and surrounding the smaller portion adjacent the closure seat of the valve, a block for obstructing said annular passage, said annular passage constituting a part of the communication between said inlet connection and said enlargement so that incoming liquid enters said annular passage adjacent said block and flows through said passage and escapes therefrom at the opposite side of said block, a first bellows sealed to the body for closing the end of said smaller portion and operatively engaged for opening said valve, a spring for closing said valve, a second bellows sealed to the body and surrounding and bearing against said spring, and means carried by the body for moving said second bellows to regulate said spring.

8. In a valve, a body having a hollow central axial portion providing a straight passage having an enlargement at one end and a jacket surrounding said axial portion, an inlet connection communicating with the space between said jacket and axial portion, said space being in communication with said enlargement, an outlet connection communicating with said straight passage at a point spaced from said enlargement, a valve for controlling communication between said enlargement and the outlet connection, a bellows sealed to the body for moving the valve toward open position, a spring for moving the valve toward closed position, and means attached to the body for supporting said spring.

9. A valve as in claim 8, in which a screen is provided between said annular space and enlargement, and supported by said body.

10. A valve as in claim 8, in which a closure member is sealed to said body and encloses said bellows, and a fluid material having a pressure variable with the temperature is located in the space between the closure member and bellows for producing thermostatic movements of the bellows and valve, and including means for changing the volume of said latter space.

11. In a valve, a structure body having a straight passage therethrough and rigid closure means surrounding the ends of said passage, inlet and outlet connections communicating with said passage at axially spaced points thereof, a valve for closing said passage and having a valve stem movble axially in said passage, a first bellows engaged with one end of the valve stem for opening the valve when the bellows collapses, oppositely acting springs, one of said springs being engaged with said first bellows and the corresponding said closure means for assisting said bellows, thermally responsive pressure means for collapsing said first bellows, a second bellows sealed with the body and engaged within the other said closure means with an end of the other said spring, said other spring being engaged with the valve for closing the same, and adjusting means carried by the other of said closure means for varying the position of said second bellows and thereby regulating said other spring, said first and second bellows being sealed to said body around the ends of said passage for closing the same and forming a sealed hollow structure to and from which the refrigerant moves by way of the inlet and outlet connection.

12. An expansion valve for a refrigerating apparatus including a body having a passage with an enlargement at one end, an inlet connection communicating with said enlargement, an outlet connection from a point of said passage axially spaced from the inlet connection, a valve including a stem axially movable in the passage and a valve head located in said enlargement so that it is heated by hot incoming refrigerating liquid, said body providing a seat for said head which is likewise heated by the incoming liquid, a spring in said enlargement engaged with the valve to close said valve head, a bellows sealed to the body for closing the other end of said passage and engaged with the valve stem to open said valve head upon collapsing, and means for collapsing said bellows.

13. A refrigeration valve including a body and means thereon for providing a valve seat and a straight passage leading from the valve seat, a valve stem movable axially in said passage and having a valve head for engaging said seat, an inlet connection, an inlet passage from said inlet connection extending in close adjacency to said means so that warm incoming liquid may heat said means, a first bellows sealed to the body and closing one end of said passage and engaging one end of said stem for moving said valve head to open position, a second bellows sealing the other end of said passage and closing the same, means for adjusting the position of said second bellows, a spring located between said second bellows and said stem for moving the valve head to closed position, an outlet connection communicating with said passage between the locations of said valve head and said first bellows, said two bellows and body forming a sealed hollow structure to and from which the refrigerant moves by way of the inlet and outlet connections, and closure means surrounding each of said bellows and supported on the valve body.

14. A refrigeration expansion valve including a body structure having a passage, inlet and outlet connections to axially spaced points of said passage, said body providing a valve seat, a valve cooperating with said seat for regulating flow through said passage, first and second bellows sealed to said body and closing the ends of said passage, said body structure also having a chamber therein adjacent said seat and providing conduit means for the flow of warm refrigerant liquid from the inlet connection through said chamber toward said passage so that the warm liquid operates to maintain the valve and its seat against sticking, said two bellows and body forming a sealed hollow structure to and from which the refrigerant moves by way of the inlet and outlet connections, closure means surrounding each of said bellows and supported on the valve body, said first bellows being connected for moving said valve to open position when the first bellows is collapsed, control means for collapsing said first bellows, a spring between said second bellows and the valve for closing the valve, and means for adjusting said second bellows to regulate said spring.

15. A self-contained refrigeration expansion valve including a body structure having spaced walls providing an inner axial passage having a valve seat at one end and a large outer chamber surrounding said passage, an inlet connection for supplying hot refrigerant liquid into said outer chamber, a valve for engaging said seat to close said passage, an outlet connection, a part of the body structure extending between said spaced walls and providing a conduit from said passage to the outlet connection, a bellows for opening said valve when collapsing, a closed dome fixed to the body structure and enclosing said bellows for providing an expansible chamber therebetween, a filling of heat-expansible material in said expansible chamber, and a spring for closing said valve when the said material contracts, the liquid in said outer chamber operating to maintain said dome against the deposit of frost thereon and to prevent said part of the body structure from transmitting any substantial cooling effect to the dome.

16. A self-contained expansion valve for a refrigerating apparatus including a body structure, said body structure having an axial passage and an inlet chamber at the lower end of the passage for receiving incoming hot refrigerant and providing a valve seat at the junction of the inlet chamber and the passage, an inlet connection to the inlet chamber, an outlet connection from an intermediate point of the passage, a valve having a valve head in said inlet chamber for engaging said valve seat for closing communication between said inlet chamber and passage and upon downward opening movement permitting refrigerant to flow upward in said passage and through said outlet, said inlet chamber being effective for maintaining a quantity of incoming hot refrigerant liquid around the valve head and spring, said valve also having a stem in said passage, a spring located in said inlet chamber and engaged with the valve for raising the same to closed position on said seat, a bellows engaged with the stem for moving the valve to open position and having its interior communicating with the upper end of said passage and sealed to the body for closing the upper end of said passage, a closed dome secured to the top of the body and surrounding the bellows, a filling of heat-expansible material in said dome responsive to the temperature of the chamber in which the dome is located so that the bellows is actuated in accordance with temperature in said chamber, and means for adjusting said spring independently of said bellows.

17. In an expansion valve for a refrigeration plant, a body having a hollow central axial portion with a valve seat at its lower end, a movable valve closure member cooperating with said seat, an inlet connection for warm refrigerant liquid, said body having a passage therein extending closely adjacent to said valve seat and communicating with the inlet connection so that the incoming warm refrigerant liquid may transmit its heat through the material of the body to the valve seat, said body having an upper annular chamber surrounding said hollow axial portion and communicating with said passage to receive refrigerant therefrom, said body also having a lower chamber in free communication with said upper chamber by passage means external to and separated from the central space of said hollow axial portion and adjacent said seat and valve closure member so that refrigerant will flow therefrom past the seat when the valve closure member is opened, and an outlet connection from the said central space.

18. An expansion valve for a refrigerating plant, comprising a body having a central space with a valve seat adjacent its lower end, a valve closure member cooperating with said seat, an inlet connection for warm refrigerant liquid, said body having passages and having external walls providing chambers for maintaining a supply of warm refrigerant liquid under pressure therein for preventing frosting of the valve body, said passages and chambers being in communication and arranged for compelling a movement of the incoming refrigerant liquid to a point adjacent to but separated from the seat and thence upward and then downward in the body and for delivering the refrigerant liquid finally at the valve seat for expansion therethrough, whereby the liquid is cooled in the valve body prior to expansion and therewith delivers its heat to the seat and body for preventing frosting.

LUCIEN L. TORREY.